Figure 1:
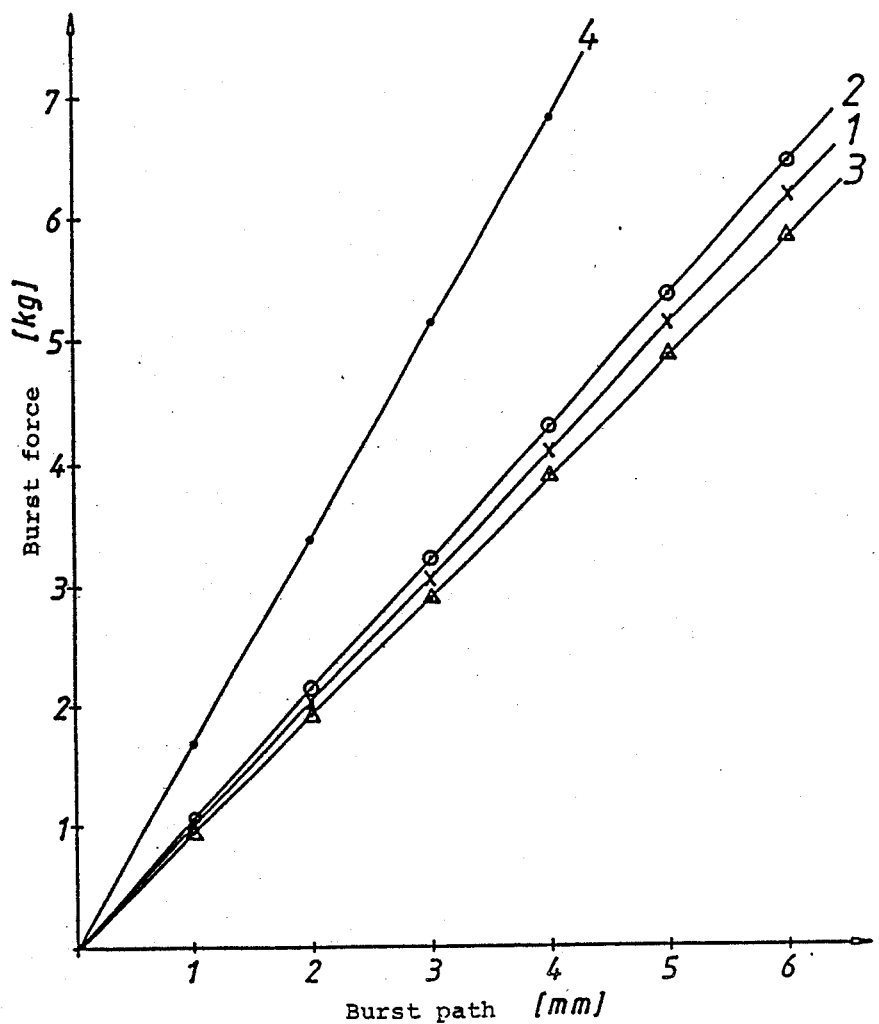

United States Patent [19]

Erk et al.

[11] Patent Number: 4,897,295
[45] Date of Patent: Jan. 30, 1990

[54] FOOD STUFFS CASING

[75] Inventors: Gayyur Erk, Gorxheimertal; Joachim Kühn, Weinheim, both of Fed. Rep. of Germany

[73] Assignee: Naturin-Werk Becker & Co., Weinheim/Bergstrasse, Fed. Rep. of Germany

[21] Appl. No.: 110,748

[22] PCT Filed: Dec. 8, 1986

[86] PCT No.: PCT/EP86/00721
§ 371 Date: Aug. 6, 1987
§ 102(e) Date: Aug. 6, 1987

[87] PCT Pub. No.: WO87/03452
PCT Pub. Date: Jun. 18, 1987

[30] Foreign Application Priority Data
Dec. 11, 1985 [DE] Fed. Rep. of Germany ....... 3543739
Jul. 26, 1986 [DE] Fed. Rep. of Germany ....... 3625409

[51] Int. Cl.$^4$ ..................... B65B 25/00; B65D 85/00; B65D 75/04
[52] U.S. Cl. .................................. 428/34.8; 138/118.1; 206/802; 206/811; 428/35.5; 428/76; 428/339; 428/474.4; 53/431; 53/435

[58] Field of Search ........................ 428/36, 34.8, 35.5, 428/76, 474.4, 339; 138/118.1; 426/105, 135; 206/802, 811; 53/431, 435

[56] References Cited

U.S. PATENT DOCUMENTS 4,303,711 12/1981 Erk et al. ......................... 138/118.1
4,487,231 12/1984 Wolf et al. ....................... 138/118.1
4,528,225 7/1985 Hutschenreuter et al. ...... 138/118.1
4,601,929 7/1986 Erk et al. ......................... 138/118.1

FOREIGN PATENT DOCUMENTS 0139888 5/1985 European Pat. Off. .
3227945 2/1984 Fed. Rep. of Germany .

Primary Examiner—Ellis P. Robinson
Assistant Examiner—James J. Seidleck
Attorney, Agent, or Firm—Sprung Horn Kramer & Woods

[57] ABSTRACT

A food stuff casing is disclosed, in particular for packing and casing hot packed food stuffs or those that are heated after packing, containing at least one polyamide, which can absorb at leasat 5% of its own weight in water prior to saturation, characterized in that the food stuffs casing contains at least 5%-wt water, no tightening lubricating agent, and no moisture retention agent.

28 Claims, 1 Drawing Sheet

Spherical Pressure Test  DIN 53325
(path-dependent measurement)

FOOD STUFFS CASING

The present invention relates to a conditioned food stuffs casing that is ready for filling, this consisting of at least one polyamide that can absorb a minimum of 5%-wt of water or of a mixture of this polyamide with at least one ionomer resin and/or an ethylene-vinylacetate copolymer, in particular for packing and encasing hot-packed food stuffs or those which are heated after packing, and a process for the production of this food stuffs casing and its use for packing and encasing food stuffs.

BACKGROUND OF THE INVENTION

The food stuffs casing according to the present invention is a further development of the polyamide sausage casing described in DE-PS 28 50 181, DE-PS 28 50 182, and DE-PS 32 27 945. Express reference is made to the patents described above. In these known casings, what is involved is a shrinkably stretched casing (DE-PS 181 and 182), or a casing that will not shrink since it is completely fixed thermally (DE-PS 945). Experience gained in the daily use and production of the successfully marketed food stuffs casings according to the above quoted patents has shown that they can be improved from the point of view of use both with regard to manufacture and to use itself.

Developments with regard to production of these casings relate to gathering and closing the casings on one side, whereas improvement with regard to application relates to avoiding processing errors with the most simple handling and this results in a significant improvement in the appearance of the product.

It is the state-of-the-art that all formerly known food stuffs casings, even those that have been improved according to the present invention, can only be shirred and yet remain undestroyed by the use of hydrophobic tightening lubricating agents, i.e., can be shirred free of any holes. Triglyceride mixtures are particularly well suited as lubricating agents that are suitable for food stuffs. As a rule, these oils are applied immediately before shirring to the shirring machine with the casing that is to be shirred.

In order that there is no negative effect in the adhesion of the sausage filling to the casing it is known that shirring lubricating agents can, as a rule, be sprayed onto the outer surface of the food stuffs casing during the shirring process using commercially conventional shirring machinery.

This process entails considerable disadvantages when used for cases according to DE-PS 28 50 181, DE-PS 28 50 182 and DE-PS 32 27 945:

The shirring lubricating agent that is applied to the exterior of the food stuffs casing wets both the surface of the casing and the shirring rollers and thus reduces friction and then, because the shirring rollers cannot move the inflated casings forward, causes a build-up on the shirring rod.

For this reason, the shirring rollers will then rotate on the same piece of casing and will heat the casing and the shirring agent such that tightening holes will result and/or the print or printing edge will be smeared.

Within certain limits varying amounts of lubricating agent on the casing surface are technically unavoidable. This results in unacceptably high differences in diameter when the casing are filled with sausage meat, for example, using conventional filling and clipping machinery having stop-lips that operate on the exterior.

The hydrophobic shirring lubricating agents make it more difficult to wet the surface of the casing with water and because of this the fundamental moistening of the casing in place. Non-homogenous or insufficiently watered casings according to DE-PS 28 50 181, DE-PS 28 50 182 and DE-PS 32 27 945 are, however, unuseable for filling because their special shrinkage and elasticity characteristics are only activated when they are saturated with water. It is not possible to fill insufficiently wetted casings so as to provide a constant diameter at the prescribed minimum. Creased and/or unequal end products are as a rule returned for such deficiencies. They are not wanted because they reduce the marketable value of the end product. The further processing of sausage goods with very varied diameters is not possible for packing when sliced because the weight of the individual slices varies too greatly.

Tightening lubricating agents are also effective as separating agents. They make it more difficult to apply labels to the finished product.

Food stuff casings according to the above cited patent specifications are normally made up into single casings of varying length which are tied off and clipped at one end. To this end, in the folding station or a conventional tying-off machine they are passed by a pair of rollers having intermeshing teeth, and thus laid up into folds and picked up by a gripper to be fixed in the folded state and then passed on the clipping and tying station. When passed to the gripper the creases in the casing open out and thus make it extremely difficult to position the clipping and tying knots accurately. It frequently happens that the clip will drill into the creases that have been opened out or will at least be crooked.

All of the deficiencies in production are causes for breakdowns in the production process. Thus, it is the principle objective of the present invention to avoid these disadvantages.

End products that are of varying diameters caused by different quantities of tightening lubricating agent on the gut and as a consequence of inadequate wetting with water when in place have already been addressed.

The avoidance of end products having greatly differing diameters is also an objective of the present invention from the point of view of application technology. The further objective of development from the application point of view is the avoidance or the minimizing of tightening folds in the end product.

It is already known that tightening of food stuffs casings that are being discussed, in particular, according to DE-PS 32 27 945 according to the state-of-the-art, which is to say in air dried condition and by the use of shirring lubricating agents, causes a sharply impressed shirring lubricating agents, causes a sharply impressed tightening fold in the casing. Even after the casing has been filled with sausage meat during a 10% diameter expansion and even after heat treatment of the filling during further lateral expansion, it is still impossible to smooth out these creases.

It is the object of the present invention to so improve the foils used for casings as in DE-PS 28 50 181, DE-PS 28 50 182 and DE-PS 32 27 945 to the point that they can be made up without any problems, i.e., without the use of an additional tightening lubricating agent and so tightened that the casings can be filled to a constant diameter and the casings can be tied off and clipped without error and without any loss and so that the filled casings display no visible tightening folds.

SUMMARY OF THE INVENTION

This task has been solved with the invention of a food stuff casing, in particular for packing and casing hot packed food stuffs or those that are heated after packing, containing at least one polyamide, which can absorb at least 5% of its own weight in water prior to saturation, characterized in that the food stuffs casing contains at least 5%-wt of water, no tightening lubricating agent, and no moisture retention agent. It is a surprising fact that by using one single measure, namely, the moistening treatment prior to making up, that all the shortcomings and deficiencies discussed above can be eliminated at one stroke in which connection these shortcomings may result from different and independent causes whereas these shortcomings result from different and independent causes. Thus, for example, it is not possible to combine causually the proceedings of the process when shirring with the process when tying-off and clipping and when processing the casings. Thus, it is not a question of general shortcomings concerning all food stuff casings, but rather of special problems connected with polyamide casings.

Extensive physical testing has shown that watering the already known casings leads to completely new characteristics. In parallel to the physical tests, the shirring and tying-off and clipping tests proved the reproducibility of these surprising findings. The evaluation of application tests with watered and made up cases shows, finally, that these can be filled to an extremely constant diameter and that the heat-treated end products display no tightening folds.

Watering the casings also results in the practical consequence that the casings according to the present invention need not be further watered prior to processing, for example, in a meat packing plant, if they are available when packed in a water saturated and moisture-proof packing. Thus, these casings are ready for filling and need no watering at the work place. This means that potentially dangerous contaminating water containers can be dispensed with.

The casings are soaked to a water content that is greater than 80% of the saturation concentration, preferably, greater than 95% and in particular, greater than 99% of the saturation concentration.

Equally progressive is the fact that it is possible to avoid the production error "prescribed minimum diameter not achieved and thus creased end product" caused by too brief a soaking period.

Ready for filling means:
(1) ready for filling as rolled goods.
(2) ready for filling bound off/clipped.
(3) ready for filling and tightened.

During the physical measurements that were carried out in order to characterize the casings according to the present invention, what is involved is:
(1) determination of the friction according to DIN 53 375
(2) a scrub test
(3) a spherical pressure test according to DIN 53 325 to simulate the tightening process on conventional tightening machines as well as to determine the microscopic damage to the tightened and bound-off and clipped food stuffs casings.

These tests are described in greater detail within the framework of the examples.

The conversion of the casings to the state according to the present invention is achieved most easily by soaking in water. This can take place from the outer surface of the casing, from the inner surface of the casing, or from the inner and outer surfaces simultaneously. In this connection, the duration of the soaking period is non-critical, as is the temperature of the water bath. However, in each case it must be ensured that the casings have absorbed the quantity of saturating water that corresponds to their chemical composition and their crystallinity. Higher water bath temperatures accelerate the absorption of water but have no effect on the quantity required for saturation.

The minimum time for achieving the saturation concentration when stored in water at room temperature amounts to 20 minutes, insofar as only freely accessible casing surfaces (unprinted, and not wetted with tightening lubricating agent) are available. At 70° C. water temperature the corresponding time amounts to only 5 minutes.

A particularly preferred process for preparing the food stuffs casings according to the present invention is their continuous water soaking from inside in accordance with an bubble technique. When this is done, uncontaminated and germ-free drinking water at 70° C. is enclosed in the casing and these are then rerolled at speeds of 10–60 m/min. This can take place in line with the casing production or after printing the casing from roll to roll, although in each case it is done before the tightening or tying-off/clipping makeup. The casing may be stored with packed in moisture-proof packing, both before and after the tightening and tying-off/clipping process. When this is done, they do not become moldy. This means that they do not undergo any negative change in characteristics. The internal water soaking process is preferred because it permits precise control of the quantity of water that is absorbed, because of the danger of recontamination of the water is to a very great extent precluded, because of the machine parts of the tightening or tying-off machines that are vulnerable to rust are protected against spray and because the inner surface of the casing permits unrestricted water soaking in contrast to a large-area printed outer side.

It is preferred that the casing according to the present invention consists of at least one polyamide which in the alpha-form is crystalized. It is particularly preferred that the casing consists of at least one of the polyamides 6 (polycaprolactam), 6.6 (polyhexamethylene adipamide) or a mixture of PA-6 and PA-6.6 and/or copolyamides of caprolactam, hexamethylene diamine and adipinic acid.

Polycaprolactam and polyhexamethylene adipamide are highly crystalline, chemically sharply defined, and for this reason constant in their water absorption during saturation.

Mixtures of these homopolyamides with each other and with special polyolefins such as ionomer resins (Surlyn (R) A1650 or 1652), Plexar (R) (Plexar 1 and Plexar 3), Admer (R) (LF 300, NF 300 and QF 300), Lupolen (R) (A2910) as well as EEA resins (Primacor 1410, 1420, 1430) are also suitable. These mixtures are described exactly in patent specifications DE-PS 28 50 181.

Copolyamides of caprolactam and/or hexamethylene adipamide or mixtures of these polyamides, which are not so precisely defined chemically and in their crystallinity and with a minimum water absorption of 7%-wt are also useable. Even casings with a polyamide portion of a mixture of polycaprolactam and polyhexamethylene adipamide and/or copolyamides of caprolactam, hexamethylene diamine, and adipinic acid are also suitable. The polyamide portion of these casings absorbs up to 13%-wt water up to the saturation concentration. Casings according to the present invention display a crystallinity of the polyamide portion of greater than 50%-vol and correspondingly a density of greater than 1.14 g/cm$^3$.

Casings according to the present invention which are of polycaprolactam have a minimum crystallinity of 50%-vol corresponding to a minimum density of 1.14 g/cm$^3$ and, related to their dry weight or the dry weight of the polyamide portion will absorb 10±0.5% water. In the case of polyhexamethylene adipamide food stuff casings or casings that contain this polyamide, the corresponding value amounts to 55%-vol, 1.14 g/cm$^3$ and 7.5±0.5%-wt.

The tubing foils according to the present invention can be straight or curved. Their thickness amounts most advantageously to 0.025–0.100 mm, preferably 0.055–0.88 mm.

Casings according to the present invention display most advantageously a bursting pressure strength of at least 0.7 bar.

The food stuffs casings according to the present invention are optionally dyed when in mass or color printed over their whole surface. However, besides water, they contain no additional additives, and in particular no tightening-lubricating agents and moisture retention agents.

Prepared in the form according to the present invention without the application of tightening lubricating agents, they can be faultlessly tightened and/or tied-off/clipped. The printed image on the casings is not smeared. It is no problem to apply adhesive labels to their outer surfaces. They are of constant diameter, with minimum variations in diameter, i.e., they can be filled along the whole length of the longitudinal axis of the sausage and are free of shirring folds. They can be supplied ready for processing in moisture-proof packaging.

It is possible, even if the degree of moisturization is far below the saturation concentration, i.e., from 3.5%-wt water content in the casing, to tie them off and clip them free of holes when tightening or at a minimal spoilage rate, and then bring the casings to their ready to fill form according to the present invention, i.e., convert them to the water saturated state in a second process step by using secondary soaking. This procedure can be used, although it is not preferred, since it does not minimize the tightening folds in the heat treated end product as is the case with the previously described and preferred one-step saturation prior to tightening.

The present invention is described in greater detail on the basis of the following examples.

EXAMPLE 1

1030 m of a simultaneously multiaxially stretched polycaprolactam tubular casing printed according to DE-PS 32 27 945 that has been thermally fixed under controlled multiaxial shrinking and having a nominal diameter of 90 mm was saturated with water in that it was filled with approximately 4 l of hot germ-free drinking water at 65° C., sealed off so as to be inflatable and rerolled from roll to roll. Because of this treatment the food stuff casing absorbed 10%-wt of water relative to its absolute dry weight. In order to ensure the even distribution of the water so absorbed in the casing walls, the casing roll was sealed and stored for 30 minutes in an LDPE bag. 25 pieces of 20 m sections were produced from this roll of water saturated tubing using a commercially available tightening machine (Type 6/1, Kuko, Gross Gerau, W. Germany) without being sprayed with tightening lubricating agent and then repacked in a moisture-proof packing. 20 of the 25 sections prepared in this manner were inflated with compressed air at 0.3 bar and checked in water in a 22-m long water bath for tightening damage (holes). In parallel to this, there was a visual inspection of the sections for smudging of the imprinted image.

The results were sorted, counted, labelled and then listed in table 1.

Four further sections were filled without the usual soaking using a commercial portioning and clipping machine (Type FCA-Super 3451, Niedecker GmbH, Frankfurt, W. Germany) so as to form heavy sausages 1.35 m long using a typical bologna filling (according to the principles for meat and meat products, 2.224.4). In 50 other sausages so filled the maximum variations in diameter were established by measuring the diameter of the sausage 0.1 m from the two ends of the sausage and at the centre of the sausage itself, and these were then classified and are listed in table 1.

Subsequently, the sausages were cooked for 3.5 hours at 78° C. in a cooking cabinet, smoked for 15 minutes using vapour saturated hot smoke, cooled by spraying and subsequent storage in a storage room at 3° C. and then checked visually for the visibility of tightening folds in the end product. The assessment is recorded in table 1. The last test section served for the precise determination of water content in the food stuffs casing and was also used to establish eventual microscopic damage during tightening with the help of the ball compression test as set out in DIN 53 325. If the microscopic damage exist, for example, at the cross-over point of several shirring folds in the form of crazing but without forming any shirring holes, but which could break through at high internal pressure during the cooking process, during this test it was established that the breaking strength $F_B$ and the path of break only achieved 30% of the actual $F_B$ and A values in a craze-free sample.

The last named test results are set out in table 2.

An additional 500 m of the roll of tubing saturated with water were cut into 1000 sections 0.5 m long using a conventional tying machine (Type ZD1, VEB Nagema, Dresden, E. Germany); these were then clipped and tied off. The spoilage caused by the clipping damage and crooked clips or knots were sorted, counted and listed in table 1. Of the remaining 30 m of the initial roll, 10 samples of 47 mm diameter were stamped out and these were used to carry out the path-dependent spherical pressure test as in DIN 53 325. When this was done, the breaking force $F_B$ and the break path of the ball piston was not determined; what was determined was the force F on the break path A in steps of 1 mm.

The plotting of F over A resulted in a path of up to 6 mm of a straight line, the slope of which is proportional to the rebound behaviour of the folds in the casing on the tying machine. Here, a multiaxial modulus of elasticity $E^*$ was measured, which was determined in (kg/mm) since it was not related to the constant casing wall thickness. $E^*$ is given in table 2. The associated curve (1) is shown in FIG. 1.

For the physical simulation of the tightening process, two further basic measurements were carried out:

(1) In order to investigate the delivery buildup in front of the shirring rod a friction test as in DIN 53 375 was used. The friction value between the outer surface of the casing saturated with water was measured against a polyurethene elastomer having a Shore-A hardness of 95. This polyurethene elastomer was applied to the tightening rollers that moved the casing onto the tightening rod. DIN test bodies were stamped out according to practice from untightened, which is to say smooth casings. The measured values are set out in table 2.

(2) In order to simulate the relationship during bending and scrubbing loading of the food stuffs casings when tightened, a scrub test was selected and this was carried out as follows:

Samples of 90×40 mm were stamped out from the casings according to example 1. The two fastening systems of the test apparatus were driven at a constant speed by an electric motor in opposite directions parallel to each other with a maximum stroke of 20 mm back and forth.

The test body was tightened so as not to stretch so that in the furthest position, i.e., at the reversal point, it did not break or tear. The scrub loading of the sample started when the electric motor was switched on. The strokes made by the machine were counted automatically and the total number of strokes until complete failure of the sample was measured. The results of this measurement (10 measurements) on the samples according to example 1 are set out in table 2.

EXAMPLE 2

The whole process as in example 1 was repeated with 1030 m of food stuffs casing as in DE-PS 32 27 945 of polyhexamethylene adipamide. The water soaking from inside during rewinding according to the inflation techniques which has been described resulted in an increase in weight of 8%. All practical application technology and physical tests of example 1 were also undertaken. The results are set out in tables 1 and 2 and in FIG. 1, curve (2).

EXAMPLE 3

The whole procedure as outlined for example 1 was repeated with 1030 m of food stuffs casing according to DE-PS 28 50 181, this consisting of 88%-wt polycaprolactam and 12%-wt ionomer resin Surlyn (R) A1652. Water soaking from inside during rewinding according to the inflation technique which has been described led to a weight increase of 8.8%. All the practical application technology and physical tests used in example 1 were carried out in this case. The results are set out in tables 1 and 2. FIG. 1 shows the route-dependent and measured line (3) of the spherical pressure test as according to DIN 53 325.

EXAMPLE 4

The same procedure as in example 1 was followed using a polyamide casing according to DE-PS 28 50 182, this consisting of pure polycaprolactam. The water soaking according to the present invention led to a water saturation value of 10%. The results of the practical, application technology and physical tests are set out in FIGS. 1 and 2. The curves of the route-dependent spherical pressure test as in DIN 53 325 is identical to line (3) in FIG. 1, for example 3.

Comparative example (state of the art according to DE-PS 32 27 945). The same tubular casing material as in example 1 was used, although without moisturization prior to make-up according to the present invention. Tightening was carried out with the use of a tightening lubricating agent Miglyol (R) 812 (a triglyceride mixture from the Dynamit-Nobel AG, Troisdorf, W. Germany) using the same tightening machine as in example 1. All the practical, application technology and physical measurements used in example 1 were made. The sausage filling water test on FCA-S were carried out with casings saturated in the work place on (to) 9% water content. Determination of microscopic damage took place with the help of the spherical pressure test as in DIN 53 325. The test samples were stamped from sections that were air dried and tightened using tightening lubricating agent. Proceeding from a supply roll of air dried material that had not been water soaked according to the present invention, 1000 sections of 0.50 m long were produced under precisely the same conditions as in example 1.

This supply roll was also used for the test samples for
1. route-dependent spherical pressure test
2. friction tests vis-à-vis PUR-elastomer and
3. for the scrub test. The results are set out in tables 1 and 2 and in FIG. 1, curve (4).

Comparative example 2 (state of the art according to DE-PS 32 27 945). The same tubular casing material was used as in example 1, although without the water soaking according to the present invention and without the application of tightening lubricating agents. It was not possible to obtain one single section that was free of holes from the 20 sections. For this reason, the application-technology and physical tests were not carried out. The results are set out in table 1. It can be seen from table 1 and table 2 that the casings according to the present invention possess the following properties in contrast to the tubular foils according to DE-PS 32 27 945:

(a) they can be tightened easily and free of holes and require no tightening lubricating agent.
(b) they can be tied off and clipped with a drastic reduction in spoilage.
(c) they can be filled with minimum variations in diameter and have no troublesome tightening folds on the end product.

TABLE 1

| | Results of shirring, Tying-off/clipping Test and Application Tests | | | | | | | |
|---|---|---|---|---|---|---|---|---|
| Example | (1) Water Content % | (2) Miglyol ® 812 | (3) shirring Spoilage % | (4) Backup % | (5) Image Smudging % | (6) Tying-off/ Clipping Spoilage % | (7) Filled Diameter Variation mm | (8) Creases in end Product |
| 1 | 10,0 | none | 0 | 0 | 0 | <1 | <±1 | none |
| 2 | 7,5 | none | 0 | 0 | 0 | <1 | <±1 | none |
| 3 | 8,8 | none | 0 | 0 | 0 | <1 | <±1 | none |
| 4 | 10,0 | none | 0 | 0 | 0 | <1 | <±1 | none |

TABLE 1-continued

Results of shirring, Tying-off/clipping Test and Application Tests

| Example | (1) Water Content % | (2) Miglyol ® 812 | (3) shirring Spoilage % | (4) Backup % | (5) Image Smudging % | (6) Tying-off/ Clipping Spoilage % | (7) Filled Diameter Variation mm | (8) Creases in end Product |
|---|---|---|---|---|---|---|---|---|
| Vgl. 1 | 1,3 | yes | 0 | 25 | 25 | 23 | ±2,5 | yes |
| Vgl. 2 | 1,3 | none | 100 | 5 | 5 | — | — | — |

(1) Measured according to differentiation after three hours at 105 +/− 2° C. in vacuum drier cabinet.
(2) Commercial tightening lubricating agent.
(3) Of 20 pieces, 20-m sections. A section with one or more holes indicated 5% spoilage.
(4) Of 20 pieces, 20-m sections. A section that is backed up on the shirring rod indicates 5% spoilage.
(5) Of 20 pieces, 20-m sections. A section with one smudged area indicated 5% spoilage.
(6) Of 1000 pieces of casing, 10 pieces clipped or tied crooked indicates 1% spoilage.
(7) Measured 0.1 m from sausage ends and at centre.
(8) Assessed visually. "No" means invisible at a distance of 0.3 m.

TABLE 2

Physical measurements

| Example | Water Content % | (1) Break-through Strength kg | (1) Break-through Strength mm | (2) E* path-dependent kg/mm | (3) Coefficient of friction | (4) Number of strokes to bursting |
|---|---|---|---|---|---|---|
| 1 | 10,0 | 15,5 | 14,8 | 1,03 | 35 | 1119 |
| 2 | 7,5 | 15,2 | 16,4 | 1,08 | 42 | 1030 |
| 3 | 8,8 | 12,5 | 12,8 | 0,98 | 48 | 1250 |
| 4 | 10,0 | 10,5 | 10,7 | 0,98 | 40 | 1170 |
|   |      | 19,1 | 11,2 |      |    |      |
|   |      | 18,8 | 11,0 |      |    |      |
| Vgl. 1 | 1,3 | 4,2 | 3,2 | 1,71 | 14 | 358 |
|   |      | 3,8 | 3,0 |      |    |      |

(1) According to DIN 53 325 up to rupturing, to determine microscopic damage visible by premature rupture. See measurements 1, 3, 4.
(2) E* is the slope of "F over a" in Figure 1. E* is proportional to the rebound behaviour of the folds. Smaller E* values indicate improved tying-off/clipping behaviour, according to the present invention.
(3) Measured as per DIN 53 375 against PUR elastomer of Shore-A 95. Friction on shirring is simulated. Oil-coated foils, as in 1, reduce the coefficient of friction and cause backups during shirring.
(4) Simulates creasing during filling. Higher values indicate greater loading ability on shirring.

THE EMBODIMENTS OF THE INVENTION IN WHICH AN EXCLUSIVE PROPERTY OR PRIVILEGE IS CLAIMED ARE DEFINED AS FOLLOWS:

1. A food stuff casing packed in a moisture-proof packing and formed at least in part of at least one polyamide having absorbed at least 5% of its own weight in water and containing no tightening lubricating agent, and no moisture retaining agent, the food stuff casing having the following physical characteristics:
   (a) ready for filling, tightened, and moistened, it has a minimum burst force of 8.0 kg and a corresponding minimum burst path of 8.5 mm, measured in accordance with DIN 53 325;
   (b) the slope of the line of burst path over burst force determined by the spherical pressure test (DIN 53 325) amounts to 0.17–1.3 (kg/mm);
   (c) the friction value determined according to DIN 53 375 of the food stuffs casing as opposed to a PUR-elastomer having a Shore-A hardness of 95 amounts to at least 30.
   (d) the casing withstands a minimum of 800 strokes without rupture, when subject to the scrub test.

2. A food stuffs casing according to claim 1, characterized by a water content 6–13%-wt.

3. A food stuffs casing according to claim 1, characterized in that its water content corresponds to the saturation content of the polyamide casing material.

4. A food stuffs casing according to claim 1, characterized in that its water content amounts to greater than 80% of its saturation concentration for water.

5. A food stuffs casing according to claim 1, characterized in that it contains polycaprolactam, polyhexamethylene adipamide, mixtures of polycaprolactam and polyhexamethylene adipamide and/or copolyamides of caprolactam, hexamethylene diamine, and adipinic acid or consists of these polyamides, and mixtures or copolyamides.

6. A food stuffs casing according to claim 1, characterized in that it consists of a mixture of 50–99%-wt of the polyamides and 1–50%-wt of at least one ionomer resin and/or a modified ethylene-vinylacetate copolymer.

7. A food stuffs casing according to claim 1, characterized in that polyamide content has a crystallinity of greater than 50%-vol corresponding to a density of greater than 1.14 g/cm$^3$.

8. A food stuffs casing according to claim 1, characterized in that it consists of a polyamide which is crystallized in alpha-form.

9. A food stuffs casing according to claim 1, characterized in that it can be filled at a maximum diameter variation that is smaller than ±1.5 mm.

10. A food stuffs casing according to claim 1, characterized in that it is of a single layer.

11. A food stuffs casing according to claim 1, characterized in that it is seamless.

12. A food stuffs casing according to claim 1, characterized in that in the tightened form it is available as a section, tied off at one end, or as a roll.

13. A food stuffs casing according to claim 1, characterized in that it is either straight or curved in the manner of a ring or part of a ring.

14. A food stuffs casing according to claim 1, characterized by a wall thickness of 0.025 to 0.100 mm.

15. A food stuffs casing according to claim 1, characterized by a bursting strength of at least 0.7 bar.

16. A process for the production of a packed food stuffs casing according to claim 1, characterized in that the casing is moistened up to the point of achieving a minimum water content of 5%, and is then packed into a moisture-proof packing.

17. A process according to claim 16, characterized in that moisturization is carried out with drinking water.

18. A process according to claim 16, characterized in that the casing was moisturized from outside.

19. A process according to claim 16, characterized in that the inside of the casing is moisturized.

20. A process according to claim 16, characterized in that after being treated with water and prior to further processing such as make-up, the casing is stored at room temperature for approximately one hour to assure the homogenous distribution of the water within the casing.

21. A process according to claim 16, characterized in that after the water absorption, the casing is tightened until the polyamide is concentrated in equilibrium.

22. A process according to claim 16, characterized in that after the absorption of water, the casing is cut into sections and these are closed off at least at one end with thread and/or a metal clip until the concentration is in equilibrium.

23. A process according to claim 16, wherein the casing is moistened up to achieving its saturation water content.

24. A process according to claim 18, wherein the casing is moisturized from the outside by storing the casing for 30-60 minutes in water.

25. A process according to claim 19, wherein the inside of the casing is moisturized by a quantity of water retained within the casing.

26. A food stuffs casing according to claim 2, wherein the water content is 7-11%-wt.

27. A food stuffs casing according to claim 4, wherein the water content amounts to more than 95% of its saturation concentration for water.

28. A food stuffs casing according to claim 27, wherein the water content amounts to more than 99% of its saturation concentration for water.

* * * * *